United States Patent
Jinba et al.

(10) Patent No.: US 8,574,778 B2
(45) Date of Patent: Nov. 5, 2013

(54) FUEL CELL STACK

(75) Inventors: Ryo Jinba, Utsunomiya (JP); Shigeru Inai, Shioya-gun (JP)

(73) Assignee: Honda Motor Co., Ltd., Tokyo (JP)

( * ) Notice: Subject to any disclaimer, the term of this patent is extended or adjusted under 35 U.S.C. 154(b) by 1193 days.

(21) Appl. No.: 12/012,322

(22) Filed: Feb. 1, 2008

(65) Prior Publication Data
US 2008/0187805 A1  Aug. 7, 2008

(30) Foreign Application Priority Data

Feb. 1, 2007 (JP) .................................. 2007-023174

(51) Int. Cl.
*H01M 8/04* (2006.01)
*H01M 8/02* (2006.01)

(52) U.S. Cl.
USPC ............................. 429/444; 429/457; 429/514

(58) Field of Classification Search
USPC ......... 429/444, 413, 434, 456, 457, 468, 442, 429/412, 411, 517
See application file for complete search history.

(56) References Cited

U.S. PATENT DOCUMENTS

| | | | |
|---|---|---|---|
| 4,689,280 A * | 8/1987 | Gionfriddo | 429/469 |
| 2003/0054223 A1 * | 3/2003 | Baba et al. | 429/38 |
| 2004/0265667 A1 * | 12/2004 | Kato et al. | 429/32 |
| 2006/0088752 A1 * | 4/2006 | Sakano et al. | 429/34 |
| 2006/0110649 A1 | 5/2006 | Nashiyama et al. | |

FOREIGN PATENT DOCUMENTS

| | | |
|---|---|---|
| JP | 2003-523057 | 7/2003 |
| JP | 2005-285402 | 10/2005 |
| JP | 2006-147502 | 6/2006 |
| WO | WO-01/59863 A2 | 8/2001 |

* cited by examiner

*Primary Examiner* — Kenneth Douyette

(74) *Attorney, Agent, or Firm* — Nelson Mullins Riley & Scarborough LLP; Anthony A. Laurentano

(57) ABSTRACT

A fuel cell stack includes a first end power generation unit and a first dummy unit adjacent to a power generation unit at one end of a stack body in a stacking direction. In the first end power generation unit, a first separator is stacked on the power generation unit, a first membrane electrode assembly is stacked on the first separator, a second separator is stacked on the first membrane electrode assembly, an electrically conductive plate is stacked on the second separator, and a third separator is stacked on the electrically conductive plate. A coolant is supplied to a coolant flow field formed between the power generation unit and the first end power generation unit, for cooling a second membrane electrolyte assembly of the power generation unit and the first membrane electrode assembly of the first end power generation unit.

6 Claims, 8 Drawing Sheets

⇨ OXYGEN-CONTAINING GAS
⇨ COOLANT
⇨ FUEL GAS

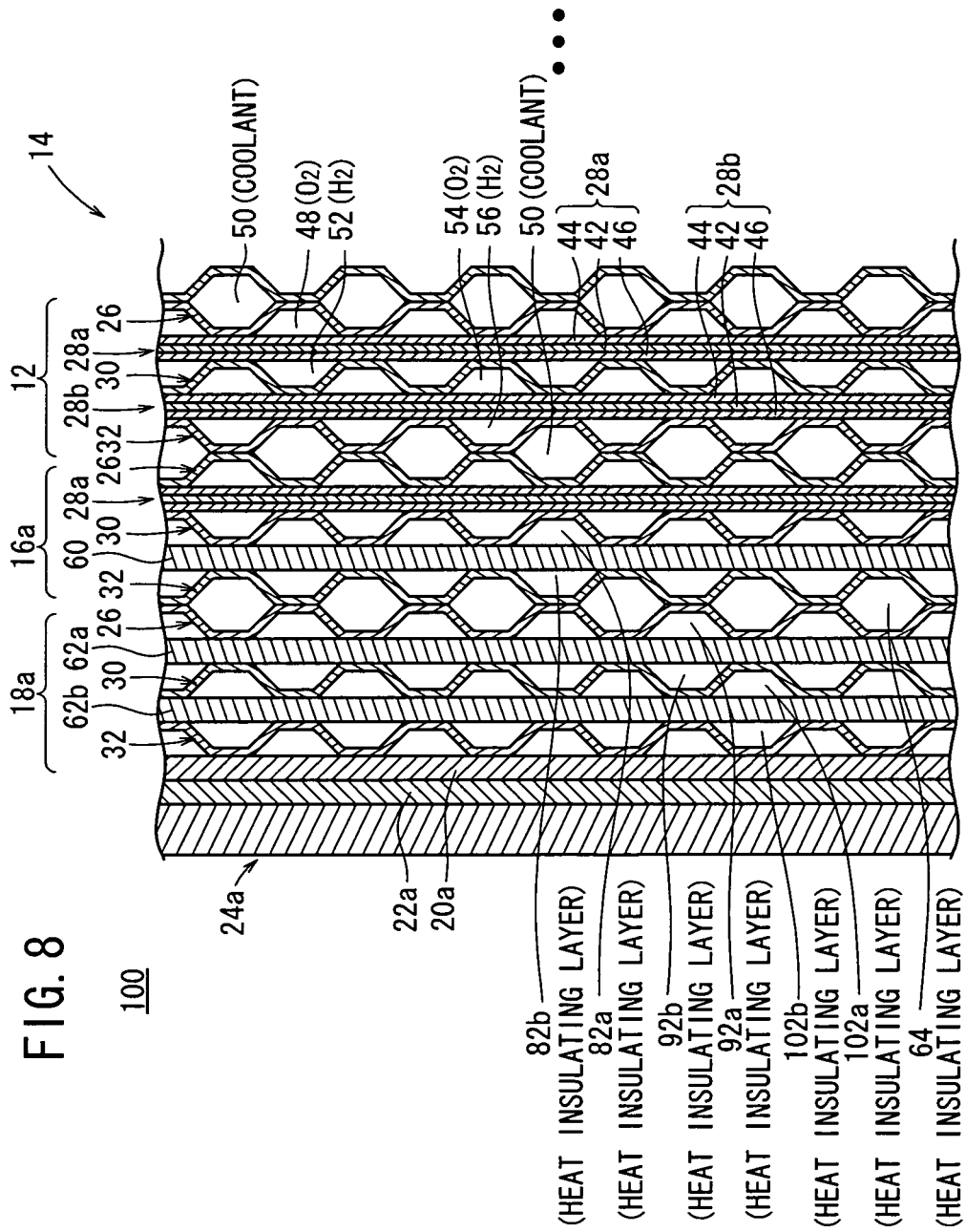

FUEL CELL STACK

BACKGROUND OF THE INVENTION

1. Field of the Invention

The present invention relates to a fuel cell stack comprising a plurality of power generation units each including at least first and second electrolyte electrode assemblies. The first electrolyte electrode assembly is stacked on a first separator, a second separator is stacked on the first electrolyte electrode assembly, the second electrolyte electrode assembly is stacked on the second separator, and a third separator is stacked on the second electrolyte electrode assembly. Each of the first and second electrolyte electrode assemblies includes a pair of electrodes and an electrolyte interposed between the electrodes.

2. Description of the Related Art

For example, a polymer electrolyte fuel cell employs a membrane electrode assembly which includes an anode, a cathode, and an electrolyte membrane interposed between the anode and the cathode. The electrolyte membrane is a polymer ion exchange membrane. The membrane electrode assembly and separators sandwiching the membrane electrode assembly make up a unit of a power generation cell for generating electricity. Normally, a predetermined numbers of the power generation cells are stacked together to form a fuel cell stack.

In the fuel cell, a fuel gas flow field (reactant gas flow field) for supplying a fuel gas along the anode and an oxygen-containing gas flow field (reactant gas flow field) for supplying an oxygen-containing gas along the cathode are provided. Further, a coolant flow field for supplying a coolant along separator surfaces is provided between the separators.

In some of power generation cells of the fuel cell stack, in comparison with the other power generation cells, the temperature is decreased easily due to heat radiation to the outside. For example, in the power generation cells provided at ends of the fuel cell stack in the stacking direction (hereinafter also referred to as the "end power generation cells"), since the heat is radiated to the outside from the terminal plates (current collecting plates) for collecting electrical charges generated in each of the power generation cells as electricity or the end plates for tightening the stacked power generation cells, the decrease in the temperature is significant.

Therefore, due to the decrease in the temperature, in the end power generation cells, in comparison with power generation cells in the central position of the fuel cell stack, water condensation occurs easily, and the water produced in the power generation cannot be discharged smoothly. Consequently, the power generation performance of the end power generation cells is low.

In this regard, for example, a fuel cell stack disclosed Japanese Laid-Open Patent Publication No. 2006-147502 is known. The fuel cell stack includes a stack body formed by stacking a plurality of power generation cells, and a dummy cell provided at least at one end of the stack body in the stacking direction. The dummy cell has a dummy electrode body including an electrically conductive plate corresponding to an electrolyte, and dummy separators sandwiching the dummy electrode body. The dummy separators have structure identical to normal separators.

In this case, the dummy cell does not use any electrolyte. Therefore, no power generation occurs in the dummy cell, and water is not produced in the dummy cell. Thus, the dummy cell itself functions as a heat insulating layer. At the time of starting operation of the fuel cell stack at low temperature, it is possible to effectively prevent the delay in the raise of temperature in the end power generation cell, and the voltage drop in the end power generation cell.

In the fuel cell stack, the coolant flow field is provided at intervals of a certain number of power generation cells for so called skip cooling. That is, in the design, the number of the coolant flow fields is decreased to reduce the overall size of the fuel cell stack in the stacking direction. In the fuel cell stack adopting the skip cooling structure of this type, it is desired to effectively prevent the delay in the raise of temperature, and voltage drop of the end power generation cell.

SUMMARY OF THE INVENTION

The present invention has been made to meet the needs as stated above, and an object of the present invention is to provide a fuel cell stack having power generation units adopting skip cooling structure, which makes it possible to equally cool respective power generation units, and maintain the desired power generation performance.

The present invention relates to a fuel cell stack comprising a plurality of power generation units each including at least first and second electrolyte electrode assemblies. The first electrolyte electrode assembly is stacked on a first separator, a second separator is stacked on the first electrolyte electrode assembly, the second electrolyte electrode assembly is stacked on the second separator, and a third separator is stacked on the second electrolyte electrode assembly. Each of the first and second electrolyte electrode assemblies includes a pair of electrodes and an electrolyte interposed between the electrodes.

In the fuel cell stack, reactant gas flow fields are formed between the first separator and the first electrolyte electrode assembly, between the first electrolyte electrode assembly and the second separator, between the second separator and the second electrolyte electrode assembly, and between the second electrolyte electrode assembly and the third separator, respectively, for flowing a predetermined reaction gas along power generation surfaces. Further, a coolant flow field is formed between the power generation units.

The fuel cell stack comprises an end power generation unit adjacent to the power generation unit provided at least at one end in a direction of stacking the power generation units. The end power generation unit is formed by stacking the first separator on the power generation unit, the first electrolyte electrode assembly on the first separator, the second separator on the first electrolyte electrode assembly, a dummy electrolyte electrode assembly on the second separator, and the third separator on the dummy electrolyte electrode assembly. The dummy electrolyte electrode assembly has an electrically conductive plate corresponding to the electrolyte.

In the present invention, the coolant flows through the coolant flow field between the power generation unit and the end power generation unit to cool the second electrolyte electrode assembly of the power generation unit and the first electrolyte electrode assembly of the end power generation unit.

In each of the power generation units, the coolant flows through the coolant flow field between the power generation units to cool the second electrolyte electrode assembly of one power generation unit and the first electrolyte electrode assembly of the other power generation unit.

Thus, in the power generation unit at the center in the stacking direction and the power generation unit at the end in the stacking direction, the coolant flowing through the single coolant flow field cools the first and second electrolyte electrode assemblies on both sides, and the heat emission and cooling are balanced equally.

Further, the end power generation unit includes the dummy electrolyte electrode assembly, and heat radiation from the end of the stack body is limited. Thus, in the fuel cell stack adopting skip cooling structure, in all of the power generation units in the stacking direction, it is possible to maintain the desired power generation performance and power generation stability.

The above and other objects, features and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 8 is a cross sectional view showing main components of a fuel cell stack according to a fourth embodiment of the present invention.

DESCRIPTION OF THE PREFERRED EMBODIMENTS

Figure 1:
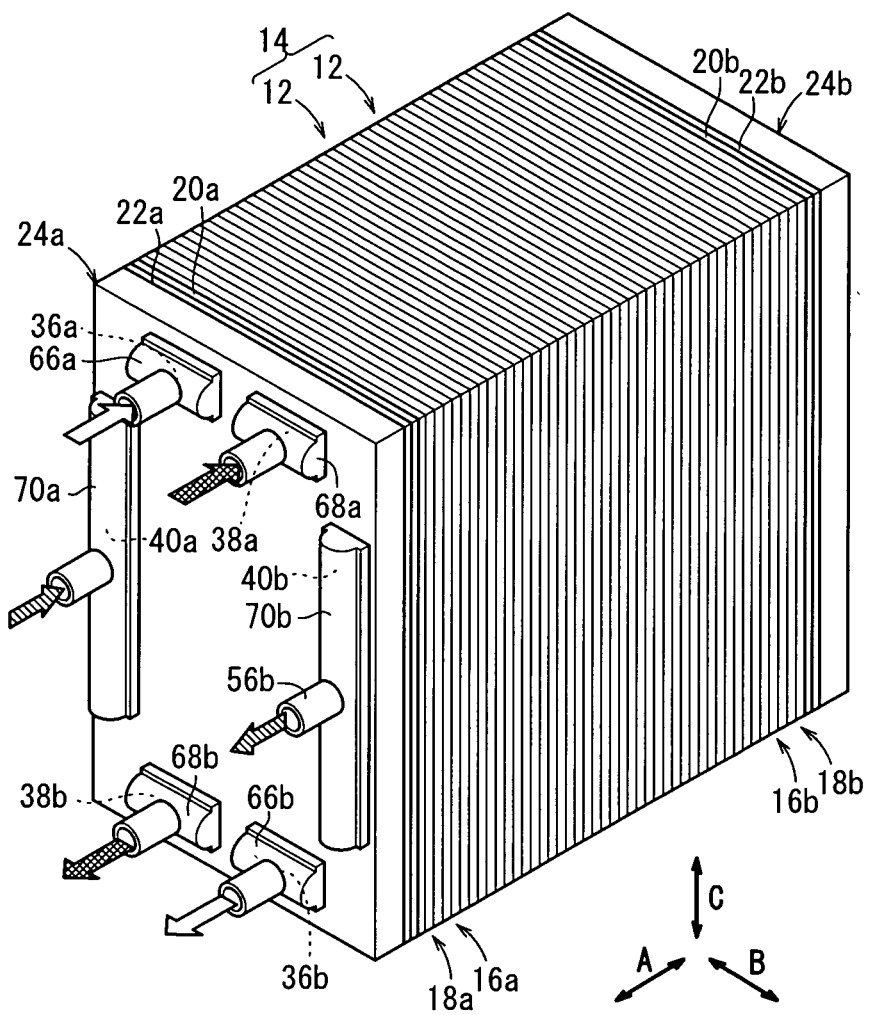
FIG. 1 is a perspective view showing a fuel cell stack according to a first embodiment of the present invention.

FIG. 1 is a perspective view schematically showing a fuel cell stack 10 according to a first embodiment of the present invention.

The fuel cell stack 10 includes a stack body 14 formed by stacking a plurality of power generation units 12 in a direction indicated by an arrow A. At one end of the stack body 14 in the stacking direction, a first end power generation unit 16a is provided, and a first dummy unit 18a is provided outside the first end power generation unit 16a. At the other end of the stack body 14 in the stacking direction, a second end power generation unit 16b is provided, and a second dummy unit 18b is provided outside the second end power generation unit 16b. Terminal plates 20a, 20b are provided outside the first and second dummy units 18a, 18b, and insulating plates 22a, 22b are provided outside the terminal plates 20a, 20b. Further, end plates 24a, 24b are provided outside the insulating plates 22a, 22b.

For example, the fuel cell stack 10 is integrally retained in a box-shaped casing (not shown) including the rectangular end plates 24a, 24b. Alternatively, components of the fuel cell stack 10 may be tightened together by a plurality of tie rods (not shown) extending in the direction indicated by the arrow A.

Figure 2:
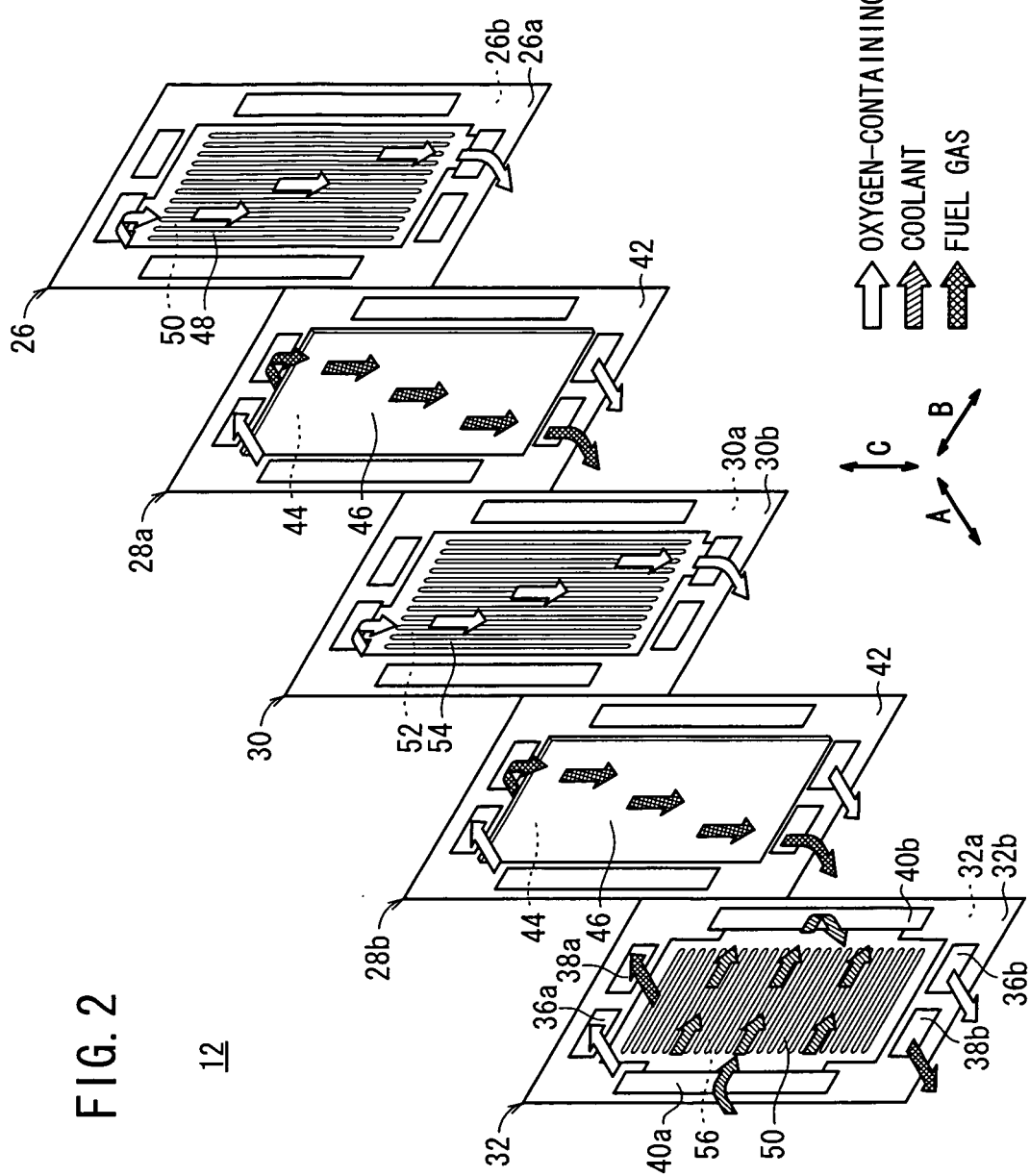
FIG. 2 is an exploded perspective view schematically showing main components of the fuel cell stack.

As shown in FIG. 2, the power generation unit 12 includes a first separator 26, a first membrane electrode assembly 28a stacked on the first separator 26, a second separator 30 stacked on the first membrane electrode assembly 28a, a second membrane electrode assembly 28b stacked on the second separator 30, and a third separator 32 stacked on the second membrane electrode assembly 28b, in the direction indicated by the arrow A. The first separator 26, the second separator 30, and the third separator 32 are metal separators or carbon separators. Though not shown, in the case of using the metal separators, seal members are formed integrally with the metal separators, and in the case of using the carbon separators, separate seal members (e.g., packing members) are stacked on the carbon separators.

At an upper end of the power generation unit 12 in a longitudinal direction, an oxygen-containing gas supply passage 36a for supplying an oxygen-containing gas, and a fuel gas supply passage 38a for supplying a fuel gas such as a hydrogen-containing gas are provided. The oxygen-containing gas supply passage 36a and the fuel gas supply passage 38a extend through the power generation unit 12 in the direction indicated by the arrow A.

At a lower end of the power generation unit 12 in the longitudinal direction, a fuel gas discharge passage 38b for discharging the fuel gas, and an oxygen-containing gas discharge passage 36b for discharging the oxygen-containing gas are provided. The fuel gas discharge passage 38b and the oxygen-containing gas discharge passage 36b extend through the power generation unit 12 in the direction indicated by the arrow A.

At one end of the power generation unit 12 in a lateral direction indicated by an arrow B, a coolant supply passage 40a for supplying a coolant is provided. At the other end of the power generation unit 12 in the lateral direction, a coolant discharge passage 40b for discharging the coolant is provided. The coolant supply passage 40a and the coolant discharge passage 40b extend through the power generation unit 12 in the direction indicated by the arrow A.

Each of the first and second membrane electrode assemblies 28a, 28b includes a cathode 44, an anode 46, and a solid polymer electrolyte membrane 42 interposed between the cathode 44 and the anode 46. The solid polymer electrolyte membrane 42 is formed by impregnating a thin membrane of perfluorosulfonic acid with water, for example.

Each of the cathode 44 and the anode 46 has a gas diffusion layer (not shown) such as a carbon paper, and an electrode catalyst layer (not shown) of platinum alloy supported on porous carbon particles. The carbon particles are deposited uniformly on the surface of the gas diffusion layer. The electrode catalyst layer of the cathode 44 and the electrode catalyst layer of the anode 46 are fixed to both surfaces of the solid polymer electrolyte membrane 42, respectively.

The first separator 26 has a first oxygen-containing gas flow field (reactant gas flow field) 48 on its surface 26a facing the first membrane electrode assembly 28a. The first oxygen-containing gas flow field 48 is connected between the oxygen-containing gas supply passage 36a and the oxygen-containing gas discharge passage 36b. The first oxygen-containing gas flow field 48 comprises a plurality of straight flow grooves extending in the direction indicated by the arrow C. A coolant flow field 50 is formed on a surface 26b of the first separator 26. The coolant flow field 50 is connected between the coolant supply passage 40a and the coolant discharge passage 40b.

The second separator 30 has a first fuel gas flow field 52 (reactant gas flow field) on its surface 30a facing the first membrane electrode assembly 28a. The first fuel gas flow field 52 is connected between the fuel gas supply passage 38a and the fuel gas discharge passage 38b. The first fuel gas flow field 52 comprises a plurality of straight flow grooves extending in the direction indicated by the arrow C.

The second separator 30 has a second oxygen-containing gas flow field (reactant gas flow field) 54 on its surface 30b facing the second membrane electrode assembly 28b. The second oxygen-containing gas flow field 54 is connected between the oxygen-containing gas supply passage 36a and the oxygen-containing gas discharge passage 36b.

The third separator 32 has a second fuel gas flow field (reactant gas flow field) 56 on its surface 32a facing the second membrane electrode assembly 28b. The second fuel gas flow field 56 is connected between the fuel gas supply passage 38a and the fuel gas discharge passage 38b. Further, a coolant flow field 50 is formed on a surface 32b of the third separator 32. The coolant flow field 50 is connected between the coolant supply passage 40a and the coolant discharge passage 40b.

Figure 3:
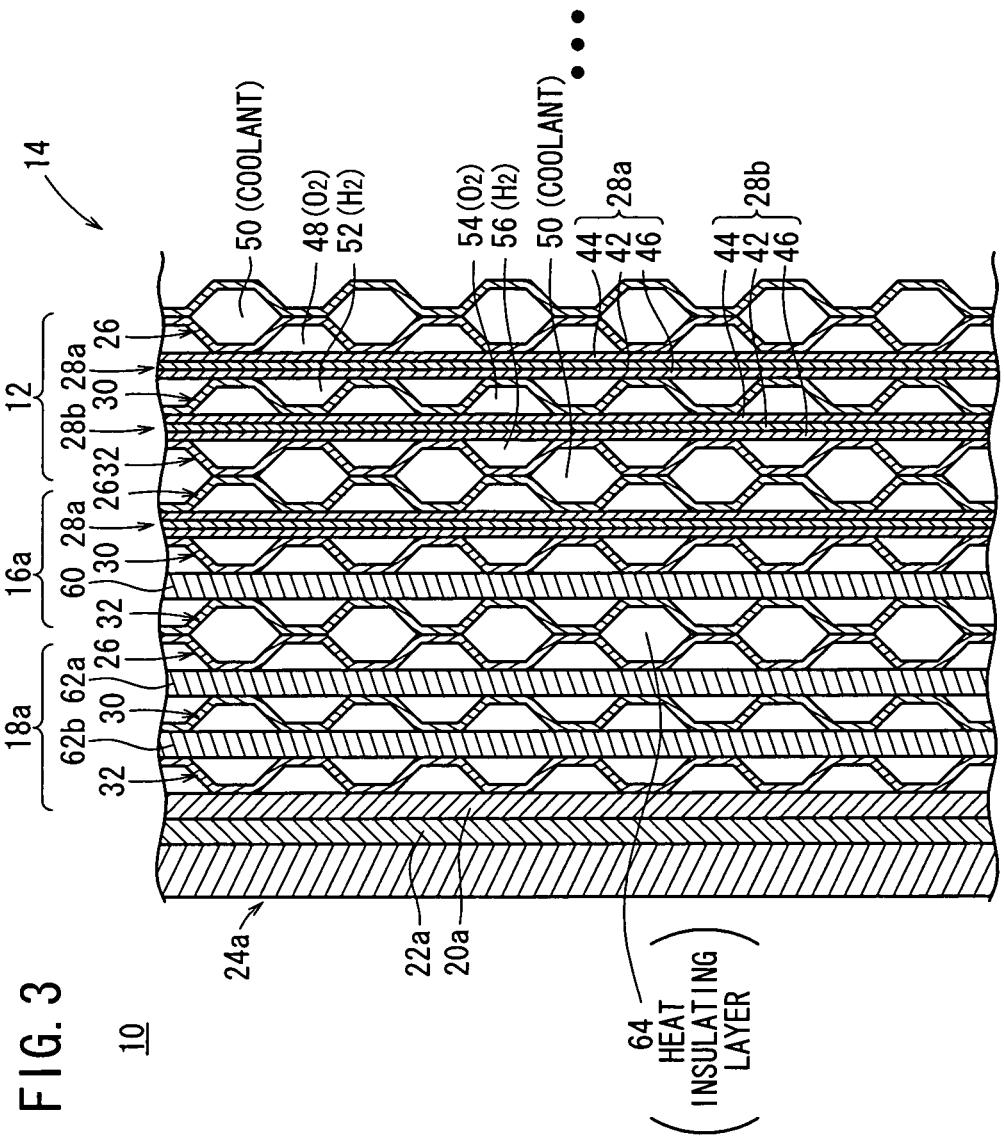
FIG. 3 is a cross sectional view showing main components of the fuel cell stack.

As shown in FIG. 3, in the first end power generation unit 16a, the first separator 26 is stacked on the power generation unit 12, the first membrane electrode assembly 28a is stacked on the first separator 26, the second separator 30 is stacked on the first membrane electrode assembly 28a, an electrically conductive plate (dummy electrolyte electrode assembly) 60 is stacked on the second separator 30, and the third separator 32 is stacked on the electrically conductive plate 60.

In the first dummy unit 18a, the first separator 26 is stacked on the first end power generation unit 16a, a first electrically conductive plate (first dummy electrolyte electrode assembly) 62a is stacked on the first separator 26, the second separator 30 is stacked on the first electrically conductive plate 62a, a second electrically conductive plate (second dummy electrolyte electrode assembly) 62b is stacked on the second separator 30, and the third separator 32 is stacked on the second electrically conductive plate 62b. The thickness of the electrically conductive plate 60, the thickness of the first electrically conductive plate 62a, and the thickness of the second electrically conductive plate 62b are equal to the thickness of the first membrane electrode assembly 28a, for example. The first dummy unit 18a has no power generation function.

A heat insulating layer 64 for limiting the flow of the coolant is formed between the first end power generation unit 16a and the first dummy unit 18a, corresponding to the coolant flow field 50. Specifically, the coolant flow field 50 is sealed from the coolant supply passage 40a and the coolant discharge passage 40b.

As shown in FIG. 1, an oxygen-containing gas inlet manifold 66a, a fuel gas inlet manifold 68a, an oxygen-containing gas outlet manifold 66b, and a fuel gas outlet manifold 68b are provided at upper and lower ends of the end plate 24a. The oxygen-containing gas inlet manifold 66a is connected to the oxygen-containing gas supply passage 36a, the fuel gas inlet manifold 68a is connected to the fuel gas supply passage 38a, the oxygen-containing gas outlet manifold 66b is connected to the oxygen-containing gas discharge passage 36b, and the fuel gas outlet manifold 68b is connected to the fuel gas discharge passage 38b.

A coolant inlet manifold 70a and a coolant outlet manifold 70b are provided at left and right ends of the end plate 24b. The coolant inlet manifold 70a is connected to the coolant supply passage 40a, and the coolant outlet manifold 70b is connected to the coolant discharge passage 40b.

Next, operation of the fuel cell stack 10 will be described below.

Firstly, as shown in FIG. 1, in the fuel cell stack 10, an oxygen-containing gas is supplied to the oxygen-containing gas inlet manifold 66a, and a fuel gas such as a hydrogen-containing gas is supplied to the fuel gas inlet manifold 68a.

Further, a coolant such as pure water or ethylene glycol is supplied to the coolant inlet manifold 70a.

As shown in FIG. 2, the oxygen-containing gas flows from the oxygen-containing gas supply passage 36a, and flows through each of the power generation units 12, into the first oxygen-containing gas flow field 48 of the first separator 26 and the second oxygen-containing gas flow field 54 of the second separator 30. Thus, the oxygen-containing gas flows downwardly along the cathodes 44 of the first and second membrane electrode assemblies 28a, 28b for inducing an electrochemical reaction at the cathodes 44.

The fuel gas flows from the fuel gas supply passage 38a, and flows through each of the power generation units 12, into the first fuel gas flow field 52 of the second separator 30 and the second fuel gas flow field 56 of the third separator 32. Thus, the fuel gas flows downwardly along the anodes 46 of the first and second membrane electrode assemblies 28a, 28b for inducing an electrochemical reaction at the anodes 46.

As described above, in each of the first and second membrane electrode assemblies 28a, 28b, the oxygen-containing gas supplied to the cathode 44, and the fuel gas supplied to the anode 46 are consumed in the electrochemical reactions at catalyst layers of the cathode 44 and the anode 46 for generating electricity.

The oxygen-containing gas consumed at the cathode 44 flows into the oxygen-containing gas discharge passage 36b, and then, the oxygen-containing gas is discharged into the oxygen-containing gas outlet manifold 66b (see FIG. 1). Likewise, the fuel gas consumed at the anode 46 flows into the fuel gas discharge passage 38b, and then, the fuel gas is discharged into the fuel gas outlet manifold 68b.

As shown in FIGS. 2 and 3, the coolant flows into the coolant flow field 50 formed between the power generation units 12. In the coolant flow field 50, the coolant flows in the direction indicated by the arrow B (in the horizontal direction in FIG. 2) for cooling the second membrane electrode assembly 28b of one of the adjacent power generation units 12, and cooling the first membrane electrode assembly 28a of the other of the adjacent power generation units 12. That is, the coolant does not cool the components of the power generation unit 12 between the first and second membrane electrode assemblies 28a, 28b. After the coolant performs so called skip cooling, the coolant is discharged from the coolant discharge passage 40b into the coolant outlet manifold 70b.

In the first embodiment, as shown in FIG. 3, the first end power generation unit 16a is provided adjacent to the power generation unit 12 at one end of the stack body 14 in the stacking direction. In the first end power generation unit 16a, the first separator 26 is stacked on the power generation unit 12, the first membrane electrode assembly 28a is stacked on the first separator 26, the second separator 30 is stacked on the first membrane electrode assembly 28a, the electrically conductive plate 60 is stacked on the second separator 30, and the third separator 32 is stacked on the electrically conductive plate 60.

In the structure, when the coolant is supplied to the coolant flow field 50 formed between the power generation unit 12 and the first end power generation unit 16a, the coolant cools the second membrane electrode assembly 28b of the power generation unit 12 and the first membrane electrode assembly 28a of the first end power generation unit 16a.

In each of the power generation units 12, the coolant is supplied to the coolant flow field 50 between the power generation units 12 to cool the second membrane electrode assembly 28b and the first membrane electrode assembly 28a on both sides of the coolant flow field 50.

Thus, in each of the power generation units 12 at the center in the stacking direction, and the power generation unit 12 at the end in the stacking direction, adjacent to the first end power generation unit 16a, the first and second membrane electrode assemblies 28a, 28b on both sides of the coolant flow field 50 are cooled by the coolant flowing through the single coolant flow field 50. Thus, heat generation and cooling are balanced equally.

Further, the first end power generation unit 16a includes the electrically conductive plate 60 as a dummy electrolyte electrode assembly, and heat radiation from the end of the stack body 14 is limited.

Further, the first dummy unit 18a is provided adjacent to the first end power generation unit 16a. The first dummy unit 18a includes the first and second electrically conductive plates 62a, 62b, and the heat insulating layer 64 corresponding to the coolant flow field 50 is provided between the first end power generation unit 16a and the first dummy unit 18a by limiting the flow of the coolant. Thus, heat radiation from the end of the stack body 14 in the stacking direction is reliably prevented.

In the second end power generation unit 16b and the second dummy unit 18b, the same operation as in the case of the first end power generation unit 16a and the first dummy unit 18a is performed.

Thus, in the fuel cell stack 10 adopting the skip cooling structure, in all of the power generation units 12 in the stacking direction, desired power generation performance and power generation stability are maintained advantageously.

Figure 4:
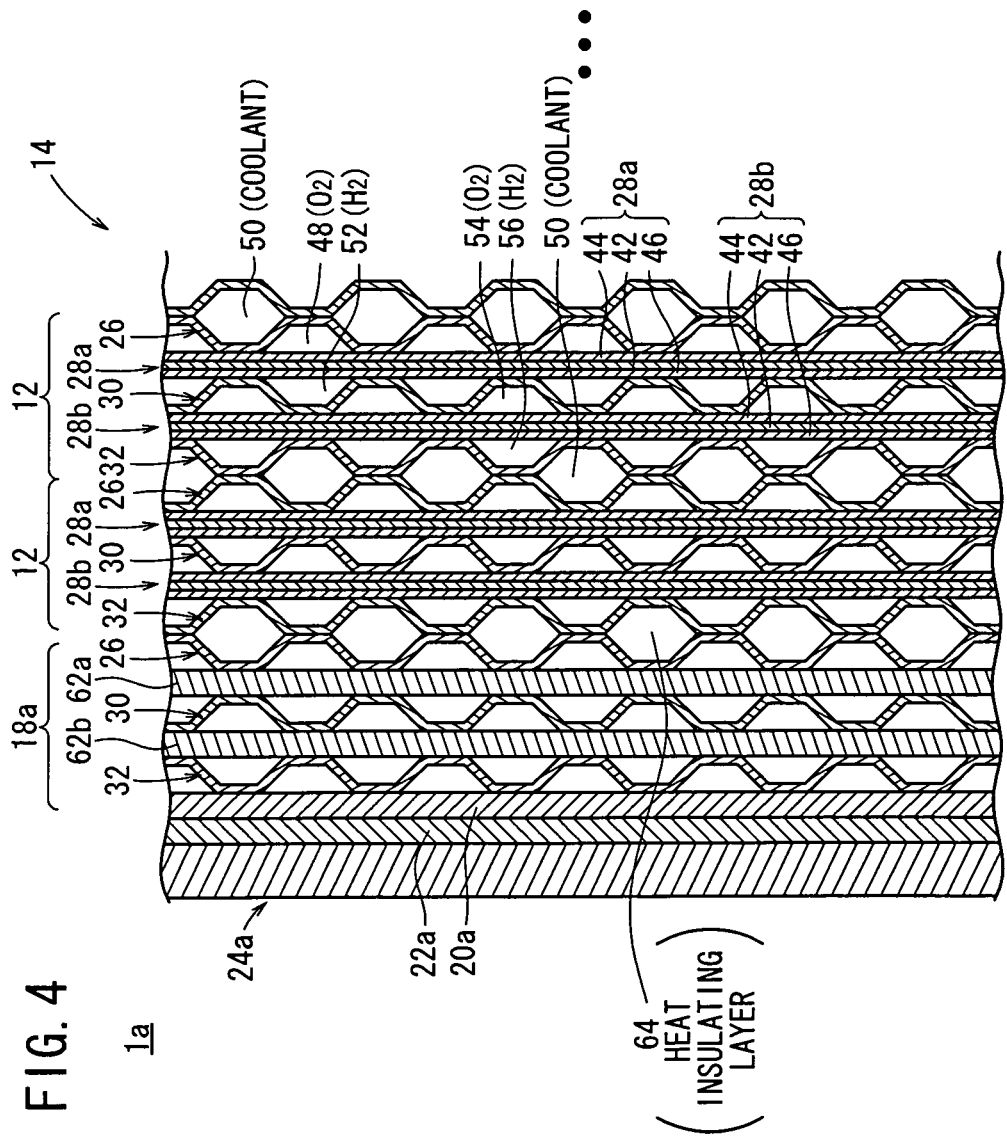
FIG. 4 is a cross sectional view showing main components of a fuel cell stack according to a first comparative example.

For example, in a fuel cell stack 1a (first comparative example) shown in FIG. 4, the first end power generation unit 16a is not provided, and only the first dummy unit 18a is provided adjacent to the outermost power generation unit 12 in the stacking direction.

In the fuel cell stack 1a, the second membrane electrode assembly 28b of the outermost power generation unit 12 is adjacent to the heat insulating layer 64, and the second membrane electrode assembly 28b is not cooled by the coolant. Thus, the temperature of the second membrane electrode assembly 28b tends to exceed the desired operating temperature. As a result, the durability becomes poor due to degradation.

Figure 5:
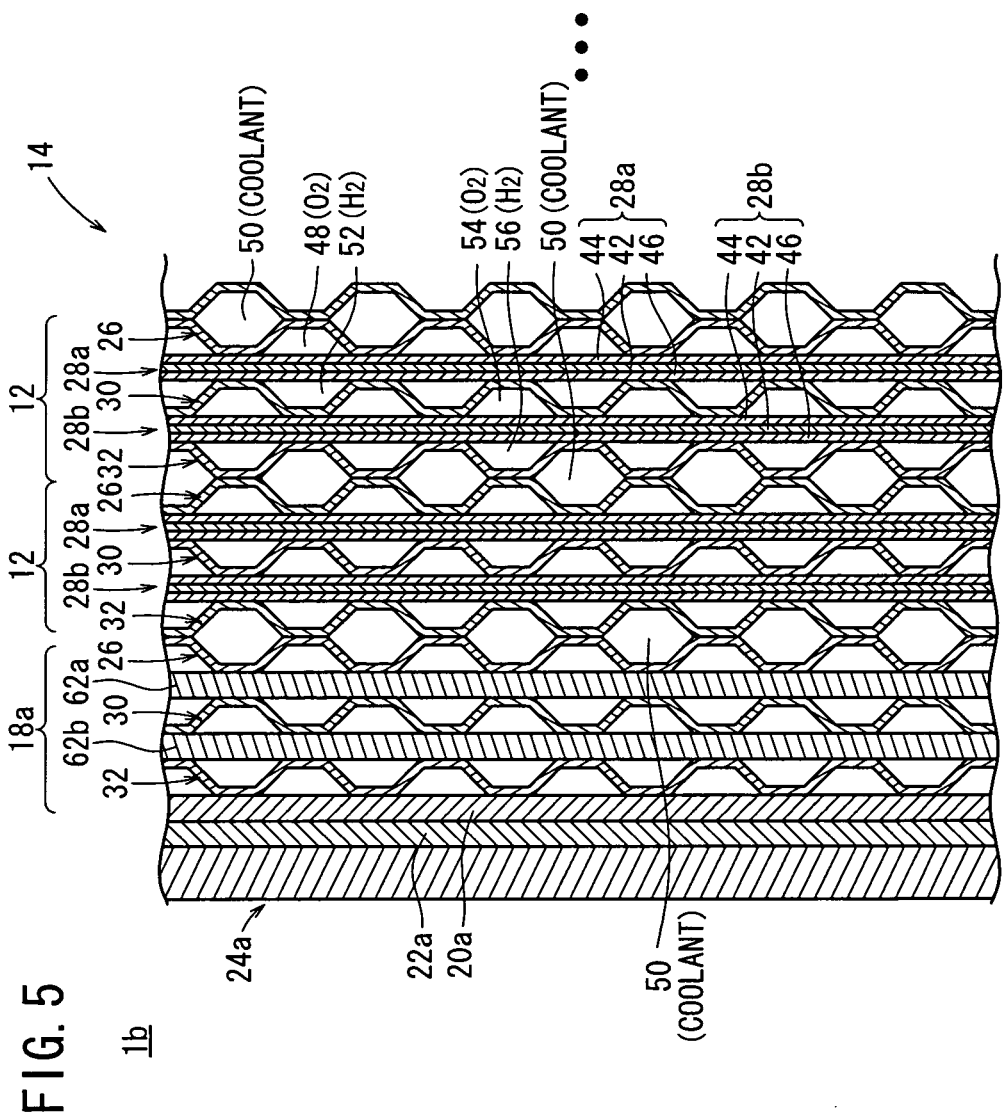
FIG. 5 is a cross sectional view showing main components of a fuel cell stack according to a second comparative example.

Further, in a fuel cell stack 1b (second comparative example) shown in FIG. 5, as in the case of the fuel cell stack 1a, the first end power generation unit 16a is not provided. Further, instead of the heat insulating layer 64, the coolant flow field 50 is provided. In the structure, the coolant is supplied to the coolant flow field 50 between the second membrane electrode assembly 28b of the outermost power generation unit 12 in the stacking direction and the first electrically conductive plate 62a of the first dummy unit 18a.

However, at the first electrically conductive plate 62a, since power generation is not performed, the temperature is not high. On the other hand, the second membrane electrode assembly 28b is cooled locally. Thus, in comparison with the first membrane electrode assemblies 28a of the power generation units 12, the second membrane electrode assembly 28b at the outermost position in the stacking direction is cooled excessively. As a result, the power generation performance and the power generation stability become poor disadvantageously.

In the first embodiment, in each of the coolant flow field 50, the coolant cools the two cells, i.e., the first membrane electrode assembly 28a and the second membrane electrode assembly 28b on both sides of the coolant flow field 50. In the structure, without causing excessive cooling of the cells or insufficient cooling of the cells, all of the power generation units 12 are cooled suitably, and the power generation performance and power generation stability are improved advantageously.

In the first embodiment, for example, the oxygen-containing gas is constantly supplied to the first and second oxygen-containing gas flow fields 48, 54 provided in the first dummy unit 18a. In the structure, water in the flow grooves is discharged, and freezing or the like of the water kept in the flow grooves is reliably prevented. Further, the fuel gas is constantly supplied to the first and second fuel gas flow fields 52, 56. Thus, the water is discharged suitably also from the flow grooves of the first and second fuel gas flow fields 52, 56.

Figure 6:
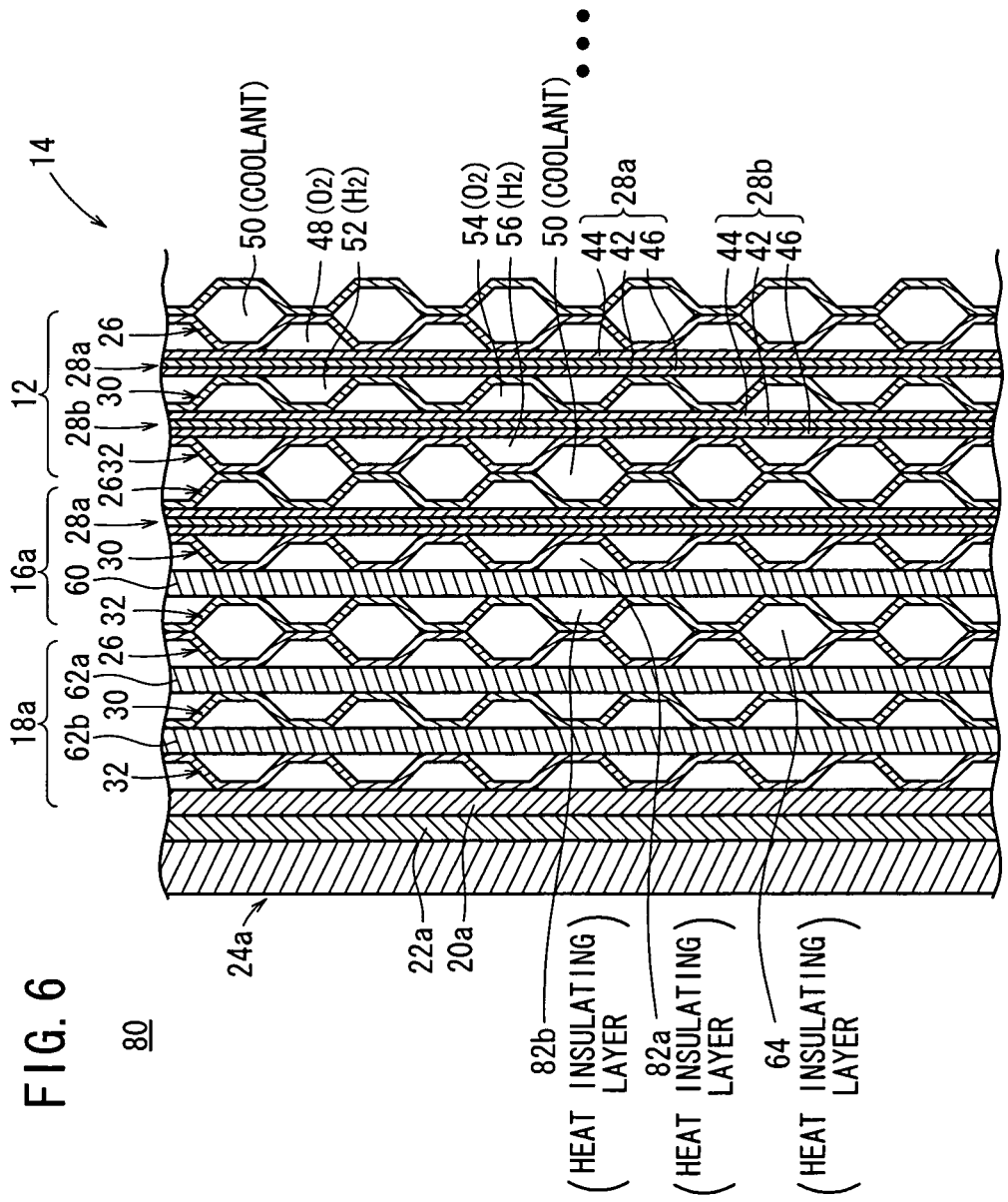
FIG. 6 is a cross sectional view showing main components of a fuel cell stack according to a second embodiment of the present invention.

FIG. 6 is a cross sectional view showing main components of a fuel cell stack 80 according to a second embodiment of the present invention. The constituent elements that are identical to those of the fuel cell stack 10 according to the first embodiment are labeled with the same reference numerals, and description thereof will be omitted. Further, in third and fourth embodiments as described later, the constituent elements that are identical to those of the fuel cell stack according to the first embodiment are labeled with the same reference numerals, and description thereof will be omitted.

In the fuel cell stack 80, a first end power generation unit 16a and a first dummy unit 18a are provided adjacent to a power generation unit 12 at one end of the stack body 14 in the stacking direction. In the first end power generation unit 16a, the first heat insulating layer 82a and the second heat insulating layer 82b are provided by limiting the flow of the oxygen-containing gas to the second oxygen-containing gas flow field 54 on one side of the electrically conductive plate 60 and the flow of the fuel gas to the second fuel gas flow field 56 on the other side of the electrically conductive plate 60.

In the second embodiment, at one end of the stack body 14 in the stacking direction, the first and second heat insulating layers 82a, 82b are provided in addition to the heat insulating layer 64. Thus, further improvement is achieved in the heat insulating performance.

Figure 7:
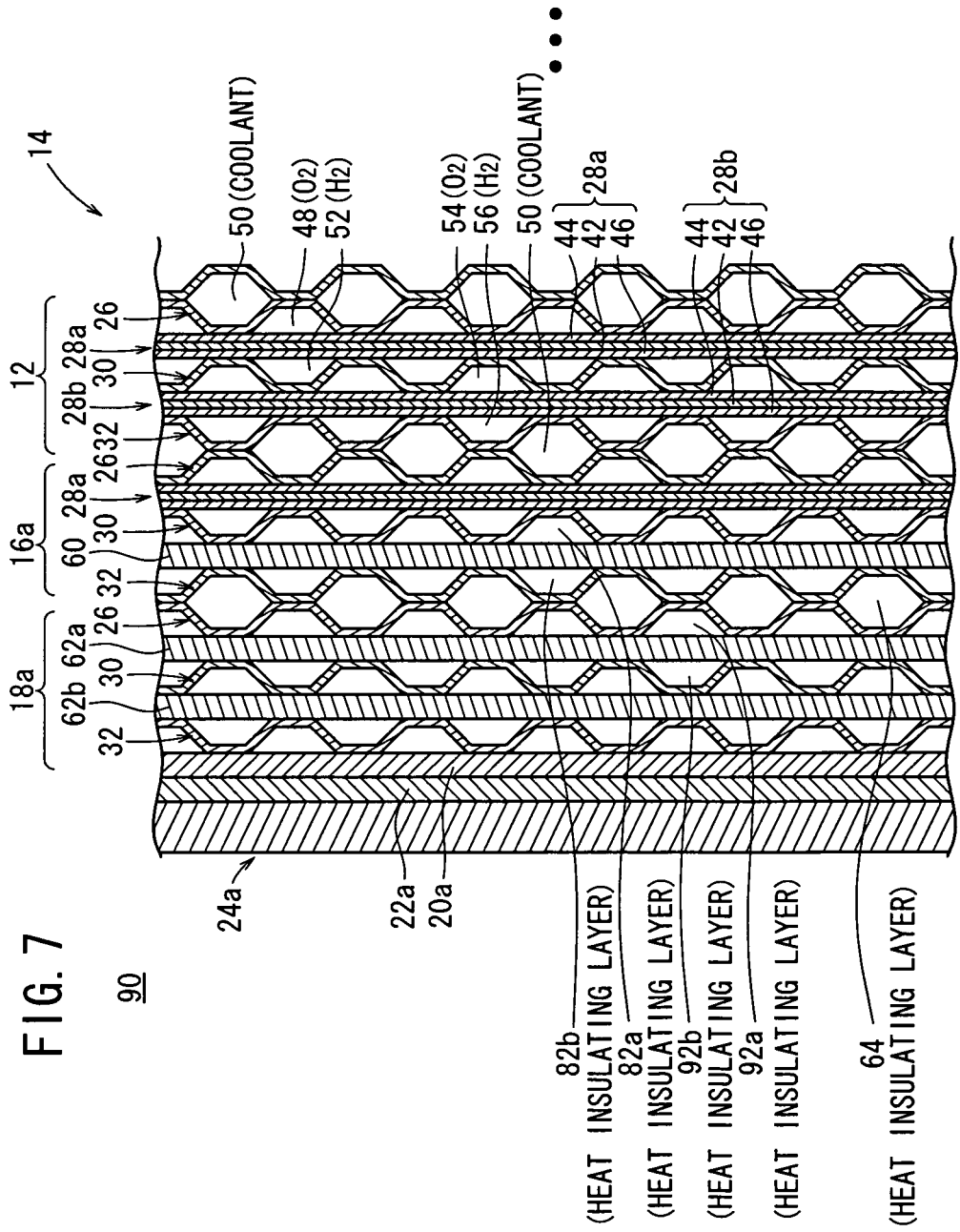
FIG. 7 is a cross sectional view showing main components of a fuel cell stack according to a third embodiment of the present invention.

FIG. 7 is a cross sectional view showing main components of a fuel cell stack 90 according to a third embodiment of the present invention.

The fuel cell stack 90 includes a first end power generation unit 16a and a first dummy unit 18a. The first and second heat insulating layers 82a, 82b are formed in the first end power generation unit 16a. In the first dummy unit 18a, third and fourth heat insulating layers 92a, 92b corresponding to the first oxygen-containing gas flow field 48 and the first fuel gas flow field 52 are formed on both sides of the first electrically conductive plate 62a by limiting the flow of the oxygen-containing gas and the flow of the fuel gas.

Thus, in the third embodiment, at one end of the stack body 14 in the stacking direction, the third and fourth heat insulating layers 92a, 92b are provided in addition to the heat insulating layer 64 and the first and second heat insulating layers 82a, 82b.

FIG. 8 is a cross sectional view showing main components of a fuel cell stack 100 according to a fourth embodiment of the present invention.

The first dummy unit 18a of the fuel cell stack 100 has fifth and sixth heat insulating layers 102a, 102b on both sides of the second electrically conductive plate 62b, corresponding to the second oxygen-containing gas flow field 54 and the second fuel gas flow field 56, by limiting the flow of the oxygen-containing gas and the flow of the fuel gas.

Thus, in the fourth embodiment, the heat insulating layer 64, the first and second heat insulating layers 82a, 82b, the third and fourth heat insulating layers 92a, 92b, and the fifth and sixth heat insulating layers 102a, 102b are provided at one end of the stack body 14 in the stacking direction, and, further improvement in the heat insulating performance is achieved.

In the first to fourth embodiments, though skip cooling is performed in every two cells of the power generation units 12, the present invention is not limited in this respect. For example, skip cooling may be performed in every three cells.

While the invention has been particularly shown and described with reference to preferred embodiments, it will be understood that variations and modifications can be effected thereto by those skilled in the art without departing from the scope of the invention as defined by the appended claims.

What is claimed is:

1. A fuel cell stack comprising a plurality of power generation units each including at least first and second electrolyte electrode assemblies, said first electrolyte electrode assembly being stacked on a first separator, a second separator being stacked on said first electrolyte electrode assembly, said second electrolyte electrode assembly being stacked on said second separator, a third separator being stacked on said second electrolyte electrode assembly, said first and second electrolyte electrode assemblies each including a pair of electrodes and an electrolyte interposed between said electrodes, reactant gas flow fields being formed between said first separator and said first electrolyte electrode assembly, between said first electrolyte electrode assembly and said second separator, between said second separator and said second electrolyte electrode assembly, and between said second electrolyte electrode assembly and said third separator, respectively, for flowing a predetermined reaction gas along power generation surfaces, a coolant flow field being formed between said power generation units, said fuel cell stack comprising:

an end power generation unit adjacent to said power generation unit provided at least at one end in a direction of stacking said power generation units; and a pair of end plates, between which the plurality of power generation units and said end power generation unit are provided, said end power generation unit being formed by stacking a first separator of the end power generation unit on said power generation unit, a first electrolyte electrode assembly of the end power generation unit on said first separator of the end power generation unit, a second separator of the end power generation unit on said first electrolyte electrode assembly of the end power generation unit, a dummy electrolyte electrode assembly on said second separator of the end power generation unit, and a third separator of the end power generation unit on said dummy electrolyte electrode assembly, respectively, wherein:

the first electrolyte electrode assembly of the end power generation unit has the same structure as the first electrolyte electrode assemblies of the power generation units, said dummy electrolyte assembly is positioned closer to one of the end plates than the first electrolyte electrode assembly of the end power generation unit at the one end, and said dummy electrolyte electrode assembly has an electrically conductive plate corresponding to said electrolyte, and said coolant flow field is sandwiched between the third separator of a power generation unit and the first separator of an adjacent power generation unit.

2. A fuel cell stack according to claim 1, wherein the thickness of said electrically conductive plate is the same as the thickness of said first electrolyte electrode assembly of said end power generation unit.

3. A fuel cell stack according to claim 1, further comprising a dummy unit adjacent to said end power generation unit, said dummy unit being formed by stacking a first separator of said dummy unit on said end power generation unit, a first dummy electrolyte electrode assembly on said first separator of said dummy unit, a second separator of said dummy unit on said first dummy electrolyte electrode assembly, a second dummy electrolyte electrode assembly on said second separator of said dummy unit, and a third separator of said dummy unit on said second dummy electrolyte electrode assembly, said first and second dummy electrolyte electrode assemblies include first and second electrically conductive plates, respectively, corresponding to said electrolyte.

4. A fuel cell stack according to claim 3, wherein the thickness of said first electrically conductive plate and the thickness of said second electrically conductive plate are the same as the thickness of said first electrolyte electrode assembly of said end power generation unit.

5. A fuel cell stack according to claim 3, wherein a heat insulating layer corresponding to said coolant flow field is provided between said end power generation unit and said dummy unit, by limiting flow of the coolant.

6. A fuel cell stack according to claim 3, wherein at least said dummy electrolyte electrode assembly, said first dummy electrolyte electrode assembly, or said second dummy electrolyte electrode assembly includes a heat insulating layer corresponding to said reactant gas flow field, by limiting flow of the reactant gas.

* * * * *